United States Patent
Youden

(10) Patent No.: US 7,542,178 B2
(45) Date of Patent: Jun. 2, 2009

(54) ELECTRONIC DEVICE DISPLAY AND DOCUMENT SCANNER

(75) Inventor: John J Youden, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1228 days.

(21) Appl. No.: 10/348,586

(22) Filed: Jan. 21, 2003

(65) Prior Publication Data

US 2004/0141216 A1 Jul. 22, 2004

(51) Int. Cl.
H04N 1/04 (2006.01)
H04N 1/32 (2006.01)

(52) U.S. Cl. .................. 358/474; 358/442; 358/443; 358/445; 358/471

(58) Field of Classification Search ................ 358/505, 358/501, 504, 509, 518, 472, 461, 474, 513, 358/471, 442, 468, 400, 445, 443, 482; 345/87, 345/207, 44, 179, 104; 382/323; 250/208.1; 348/308; 708/140
See application file for complete search history.

(56) References Cited

U.S. PATENT DOCUMENTS

| | | | |
|---|---|---|---|
| 5,243,332 A | | 9/1993 | Jacobson |
| 5,416,610 A | * | 5/1995 | Kikinis ................ 358/474 |
| 5,424,855 A | * | 6/1995 | Nakamura et al. ......... 358/472 |
| 5,917,464 A | | 6/1999 | Stearns |
| 5,920,401 A | | 7/1999 | Street et al. |
| 6,005,990 A | * | 12/1999 | Barrett et al. ............... 382/323 |
| 6,421,146 B1 | * | 7/2002 | Yoo .......................... 358/461 |
| 6,690,420 B1 | * | 2/2004 | Liu ............................. 348/241 |
| 2001/0040703 A1 | * | 11/2001 | Iseki et al. .................. 358/474 |
| 2004/0085468 A1 | * | 5/2004 | Knee et al. .................. 348/308 |
| 2004/0099790 A1 | * | 5/2004 | Knee et al. ............... 250/208.1 |

FOREIGN PATENT DOCUMENTS

| | | |
|---|---|---|
| EP | 0633542 B1 | 10/2001 |
| WO | WO97/05597 | 2/1997 |

\* cited by examiner

Primary Examiner—Cheukfan Lee

(57) ABSTRACT

A method of scanning a portion of a document using an electronic device includes activating a data input to a picture element of the display to illuminate the portion of the document, in which the document is located proximate to the display. The method also includes deactivating the data input and measuring, by way of the data input, a signal from a photosensitive device, the signal being indicative of the light reflected from the illuminated portion of the document.

22 Claims, 7 Drawing Sheets

ELECTRONIC DEVICE DISPLAY AND DOCUMENT SCANNER

BACKGROUND OF THE INVENTION

In both home and office computing environments, there is a continuing need for information to be converted from a paper-based media to an electronic media so that the information can be accessed and manipulated by the user. Typically, a scanner is used to convert the paper-based media to an electronic format. However, conventional scanners can be bulky and often cumbersome devices that require a cable to interface the scanner to the electronic equipment. Further, a scanner typically makes use of moving parts that enable an optical device to travel over the paper-based media to be scanned. These moving parts are subject to mechanical wear and breakdown, thereby reducing the appeal of using a scanner to convert from a paper-based media to an electronic media.

BRIEF SUMMARY OF THE INVENTION

A method of scanning a portion of a document using an electronic device includes activating an input to a picture element of a display to illuminate the portion of the document, in which the document is located proximate to the display. The method also includes deactivating the data input and measuring, by way of the data input, a signal from a photosensitive device, the signal being Indicative of the light reflected from the illuminated portion of the document.

DETAILED DESCRIPTION OF THE INVENTION

Figure 1B:
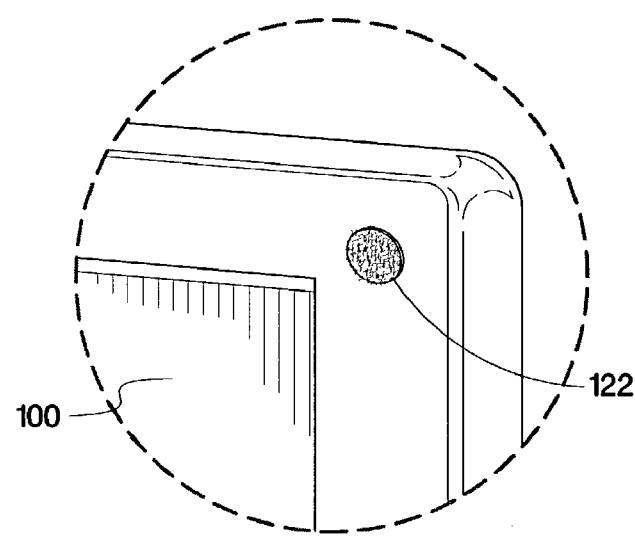
FIGS. 1a-1b show an electronic device display and document scanner according to an embodiment of the invention.
Figure 1A:
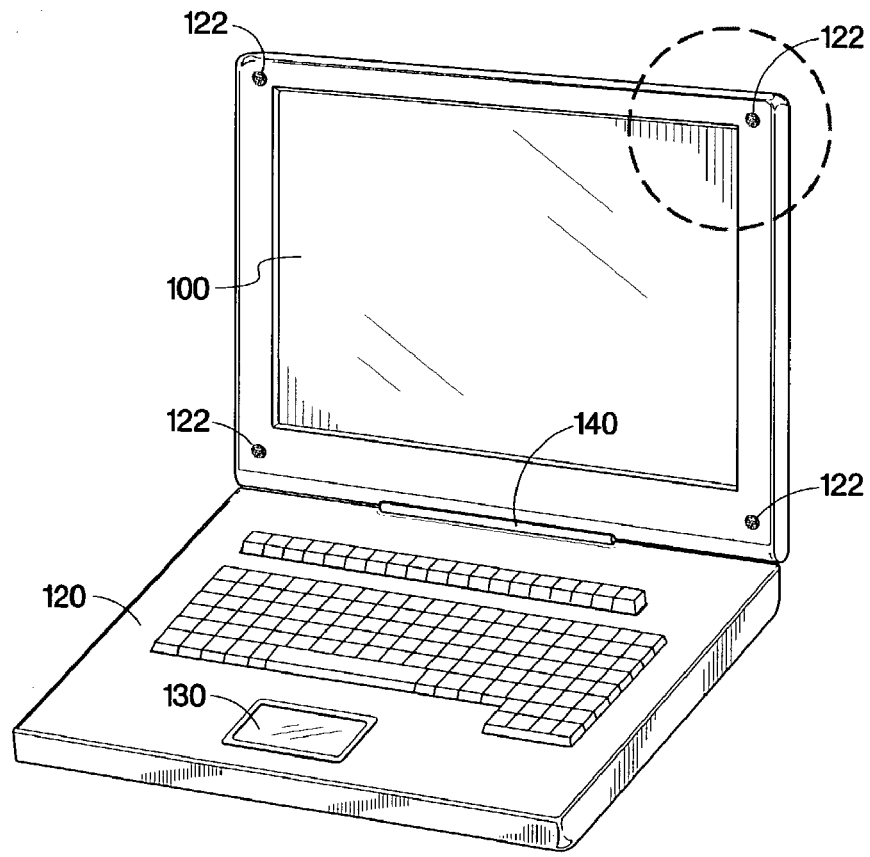

FIGS. 1a-1b show an electronic device display and document scanner according to an embodiment of the invention. FIG. 1a represents any type of hand-held or laptop computing device, desktop computer, server, or any other electronic device that includes a capability to receive a command from a user, perform computing functions using the command, and display information to a user that results from the received command. In FIG. 1a, display 100 is a liquid crystal or light-emitting diode type of display that displays information to a user of the electronic device. The user may enter information into the electronic device of FIG. 1a by way of keyboard 120 and may position a cursor on display 100 by way of touchpad 130. In the embodiments of FIG. 1, hinge 140 is used to rotate display 100 toward and away from keyboard 120 and touchpad 130 so that the user can prepare the electronic device for insertion into a container for transport to another location. Although it is desirable for the viewing surface of display 100 to be at least as large as a standard-sized document, such as 21.6 cm×27.9 cm (8.5 inches×11.0 inches), embodiments of the invention may include a display having a viewing surface that is smaller than a standard-sized document.

The electronic device of FIG. 1a includes retaining surfaces 122, shown in greater detail in FIG. 1b, which are used to retain a document proximate with the surface of display 100. Retaining surfaces 122 may be a Velcro™ type material having a hook surface that joins with a matching loop surface thereby functioning to retain a document holder proximate with display 100. In another embodiment, retaining surfaces 122 employ a magnetic material that retains a metallic document holder. The document holder is discussed in greater detail in reference to FIGS. 2a and 2b.

Figure 2A:
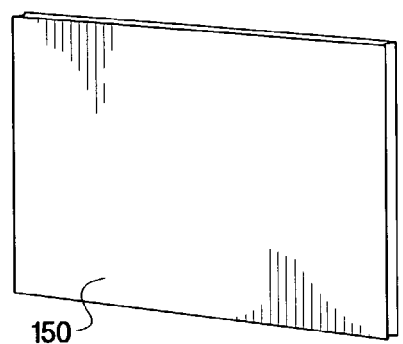
FIGS. 2a-2c show the electronic device display and document scanner of FIG. 1 and a cover that is added to the electronic device according to an embodiment of the invention.
Figure 2B:
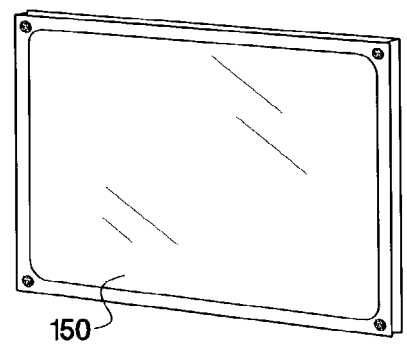
Figure 2C:
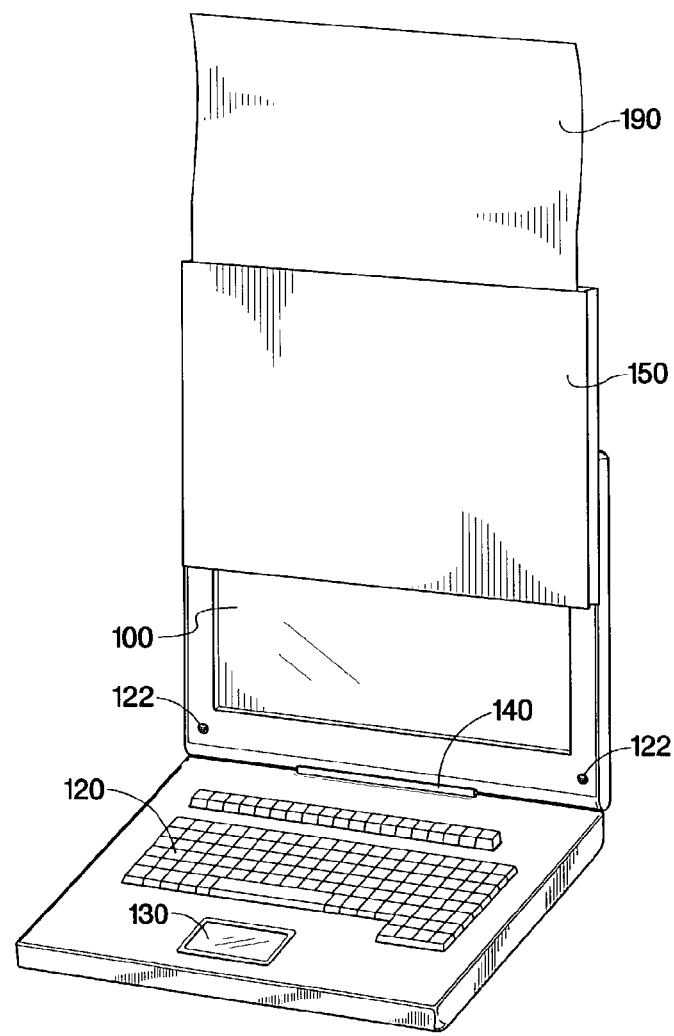

FIGS. 2a-2c show the electronic device display and document scanner of FIG. 1a-1b and a document holder that is added to the electronic device according to an embodiment of the invention. In FIG. 2, document holder 150 includes a transparent side (FIG. 2b), which faces the display 100, and a substantially opaque side (FIG. 2a), which faces the opposite direction. Document holder 150 includes a slot or other opening that permits document 190 to be inserted into the document holder, as shown in FIG. 2c. In the embodiment of FIG. 2, document holder 150 includes provisions (such as a Velcro™ type material having a hook surface that joins with a matching loop surface) that allow the holder to be retained by retaining surfaces 122. Thus, document holder 150 may include a magnetic material that is attracted to retaining surface 122, or may make use of any other technique to retain the document in contact or in proximity with surface 100.

In the embodiment of FIG. 2c, document holder 150 is used to retain paper document 190 proximate with the surface of display 100. However, other embodiments of the invention may include other techniques to retain document 190 in contact with, or proximate to the surface of display 100. In the embodiments described herein, document 190, which includes any type of printed media, can be scanned using the electronic device of FIG. 1a operating in accordance with one or more of the exemplary methods described herein. The electronic device and document scanner of FIG. 2c enables document 190 to be converted from a paper media to an electronic media without the use of moving parts that scan an optical device over the document.

Figure 3:
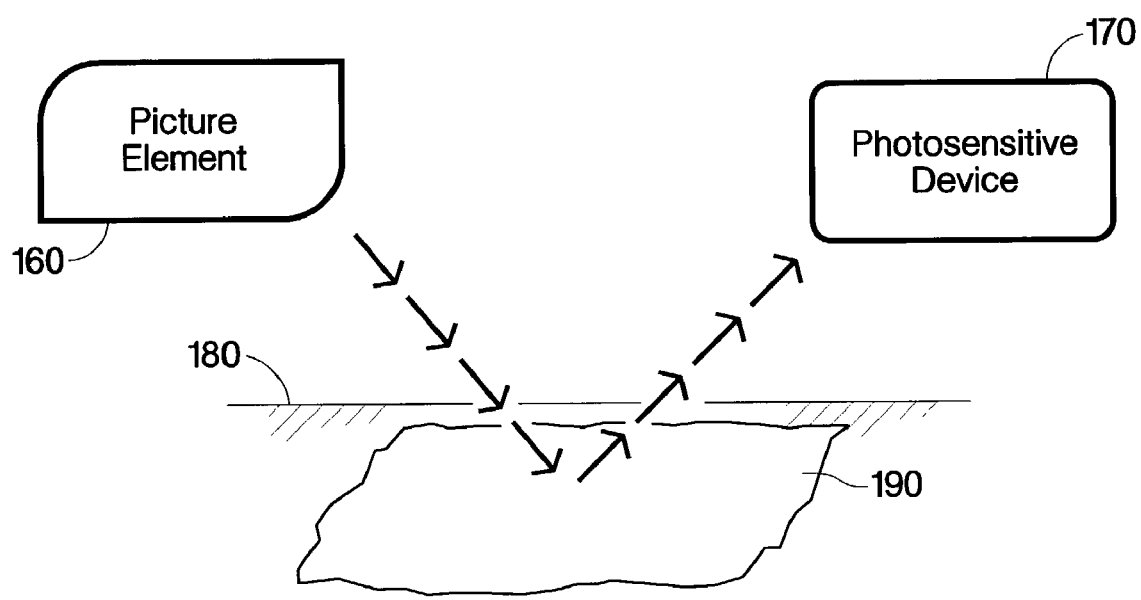
FIG. 3 shows the interaction of a picture element, a portion of a document, and a photosensitive device that operate according to an embodiment of the invention.

FIG. 3 shows the interaction of a picture element, a portion of document 190, and a photosensitive device that operate according to an embodiment of the invention. In the embodiment of FIG. 3, a portion of document 190 is placed in contact with or at least proximate with surface 180 of display 100 (of FIG. 2). Picture element 160 represents one of perhaps thousands or even millions of individually-controllable picture elements arranged in a two-dimensional array that present information from display 100 to the user of the electronic device. Picture element 160 may be, for example, a light-emitting diode picture element that produces a particular wavelength or group of wavelengths of light in response to a data input that switches the picture element between an "on" and an "off" state. In another embodiment, picture element 160 represents a liquid crystal that functions as a shutter placed between a light source and viewing surface 180. In this embodiment, picture element 160 changes from being substantially opaque to being substantially transparent in response to a data input to the picture element. Thus, picture element 160 either modulates light coming from a light source within display 100 or may represent an individual light-generating picture element.

Photosensitive device 170 represents any type of device, such as photodiode, phototransistor, and so forth that produces an electrical signal when the device is exposed to light. This signal can be used to indicate the light reflected from the portion of document 190. It is contemplated that photosensitive device 170 is produced in a manner similar to the process used to deposit picture element 160 onto a conventional liquid crystal or light-emitting diode type of display. In the embodiment of FIG. 3, photosensitive device 170 and picture element 160 are substantially collocated with each other, but may be deposited on a different layer in order to maintain electrical isolation from each other. In the embodiments contemplated herein, for each one of picture elements 160 there is one of photosensitive devices 170 substantially collocated with the picture element. However, other embodiments of the invention may not employ this 1:1 correspondence between picture elements and photosensitive devices.

Thus, light either generated by or passing through a substantially transparent picture element (160) is incident upon a portion of document 190. Light reflected from the portion of document 190 is conveyed to photosensitive device 170. Photosensitive device 170, in turn, produces an illumination-induced signal in response to the light reflected from the portion of document 190. In this manner, the information printed or otherwise positioned at the portion of document 190 can be converted to an electrical signal and read by an external sensor.

The above-described process of illuminating a portion of document 190, reflecting an amount of light from the illuminated portion, and converting the reflected light to an electronic signal can be repeated across at least a substantial number of the picture elements and photosensitive devices that populate display 100 of the electronic device. By repeating this process across the display, the information present on an entire document can be converted to electronic signals that pertain to the information present at particular portions of the document. The information included in these electronic signals can then be assembled and written to a computer memory for further processing. This further processing may include, but is not limited to, optical character recognition, printing, and storage as an image or as a graphics object.

Figure 4:
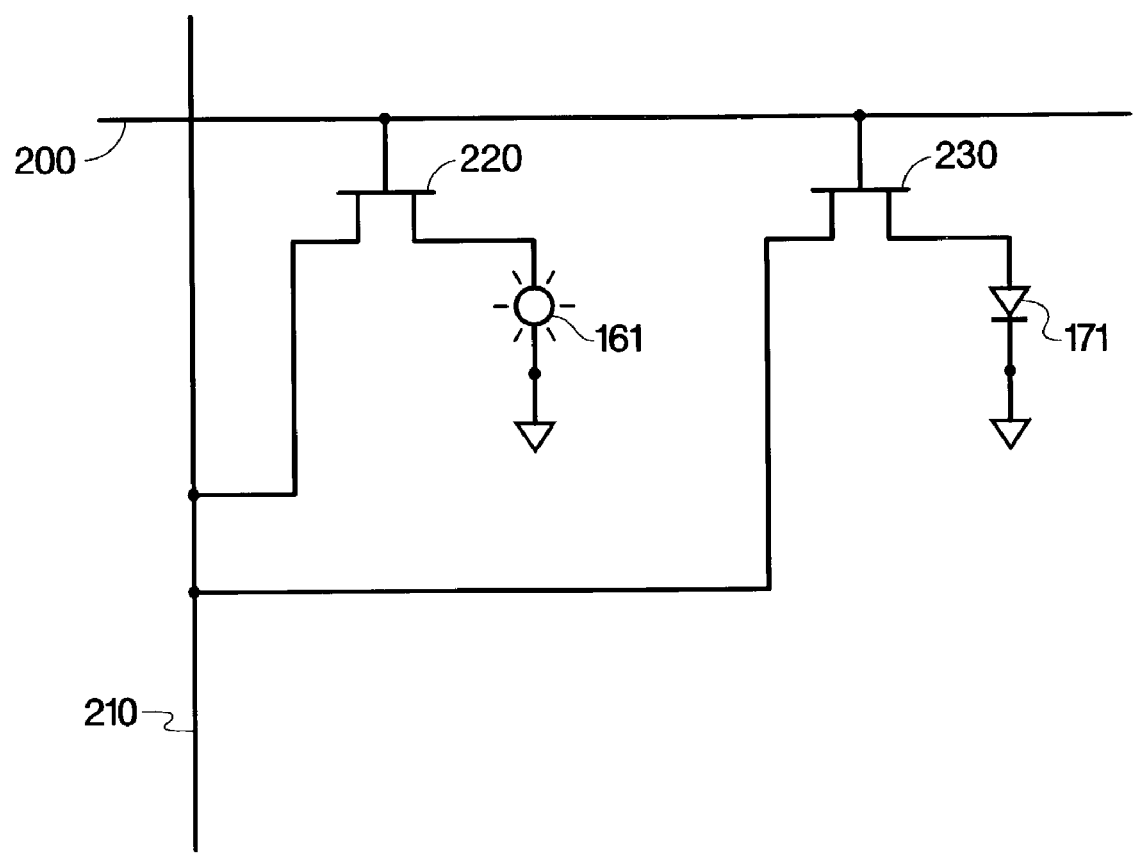
FIG. 4 shows a particular implementation of the picture elements and photosensitive device of FIG. 3 according to an embodiment of the invention.

FIG. 4 shows a particular implementation of the picture elements and photosensitive device of FIG. 3 according to an embodiment of the invention. In FIG. 4, transistors 220 and 230 represent switching devices that control picture element 161 and photosensitive device 171, respectively. Data input 210 provides a current path into or out of transistors 220 and 230. Select input 200 provides control over the gates of transistors 220 and 230 as described herein. In the embodiment of FIG. 4, transistor 220 represents an N-channel field-effect transistor, while transistor 230 represents a P-channel field-effect transistor.

In order to bring about illumination of a portion of document 190, as discussed in reference to FIG. 3, select input 200 and data input 210 are first driven to a positive state or otherwise activated in a manner that influences transistor 220 to "charge" picture element 161. In the embodiments described herein, select input 200 selects a picture element, while data input 210 activates the picture element by conveying charge to or from the picture element. Thus, the intensity of light provided by each picture element is controlled by data input 210.

In the case of a light-emitting diode type of display, the charging of picture element 161 causes the picture element to emit light. In the case of a liquid crystal display, the charging of picture element 161 causes the picture element to become transparent so as to allow light to pass through the picture element and onto the portion of document 190 (of FIG. 3) proximate with the picture element. Since transistor 230 represents a P-channel field-effect transistor, the positive voltage applied to transistor 220 (by way of select input 200) does not cause a substantial current to be conducted within the transistor. Thus, transistor 230 remains in an "off" state.

It is contemplated that picture element 161 emits light for some time after select input 200 has been inactivated. Thus, when select input 200 is inactivated, light continues to be generated by picture element 161, and at least some of this light is reflected from the portion of document 190. Select input 200 is then driven to a negative state or otherwise activated in a manner that influences transistor 230 to allow a current to flow through photosensitive device 171. While current is flowing through photosensitive device 171, data input 210 is switched to a negative voltage in order to reverse bias photosensitive device 171. With photosensitive device 171 reverse biased, the current conducted through the photosensitive device represents an illumination-induced current that pertains to the information present at the portion of document 190 illuminated by picture element 161. The current flowing through photosensitive device 171 can then be measured using data input 210. If the portion of document 190 is predominantly black, a small amount of charge is induced in the photosensitive device. If the portion of document 190 is predominantly white, a larger amount of charge is induced in the photosensitive device.

As previously mentioned, each picture element 161 and corresponding photosensitive device 171 is contemplated as being substantially collocated. Further, thousands or perhaps millions of picture elements 161 and corresponding photosensitive devices 171 are contemplated as being distributed in a row and column fashion across display 100. Thus, the above-described process of manipulation of select input 200 and data line 210 is repeated across at least a substantial number (or perhaps even all) of the picture elements 161 and photosensitive devices 171 distributed across the display.

It is contemplated that using technology known to those of skill in the art, the previously-described process of illumination of picture element 161 followed by determining the induced current in photosensitive device 171 can be performed within 10 microseconds. Thus, in the event that display 100 includes one million of picture elements 161 and one million photosensitive devices 171, a document placed in contact with the display can be scanned in a period of 10 seconds. Additionally, the portion of document 190 represents an area of the document on the order of one-millionth of the total area encompassed by the document.

In some embodiments of the invention, more than one picture element of display 100 can be illuminated at a single time, provided that negligible cross coupling exists between the photosensitive devices collocated with the simultaneously-illuminated picture elements. Thus, depending on the layout of picture elements 161 and photosensitive devices 171, the distance from these devices to the surface of the document 190, and other constraints, some embodiments of the invention may allow two or more picture elements (separated by some distance) to be illuminated at one time. This concurrent picture element illumination can significantly reduce the time required to scan document 190.

The embodiment of FIG. 4 assumes that a single color is emitted or at least controlled by the action of picture element 161. However, nothing prevents picture element 161 from being a red, green, or blue light-emitting picture element. The use of picture elements that emit light of various wavelengths, or at least control the emission of light at various wavelengths (for the case of liquid crystal displays), allows the scanning of documents using multiple colors. Thus, a document can be scanned using the red picture elements of display 100 followed by the green picture elements and finally by the blue picture elements. The resulting color-dependent illumination-induced currents received from the corresponding photosensitive devices 170 can then be arranged on a color-by-color basis and stored within a memory of the electronic device. Although a color system that makes use of red, green, and blue as primary colors has been contemplated, nothing prevents the use of picture elements comprising other colors to bring about the display of a color palette.

Figure 5:
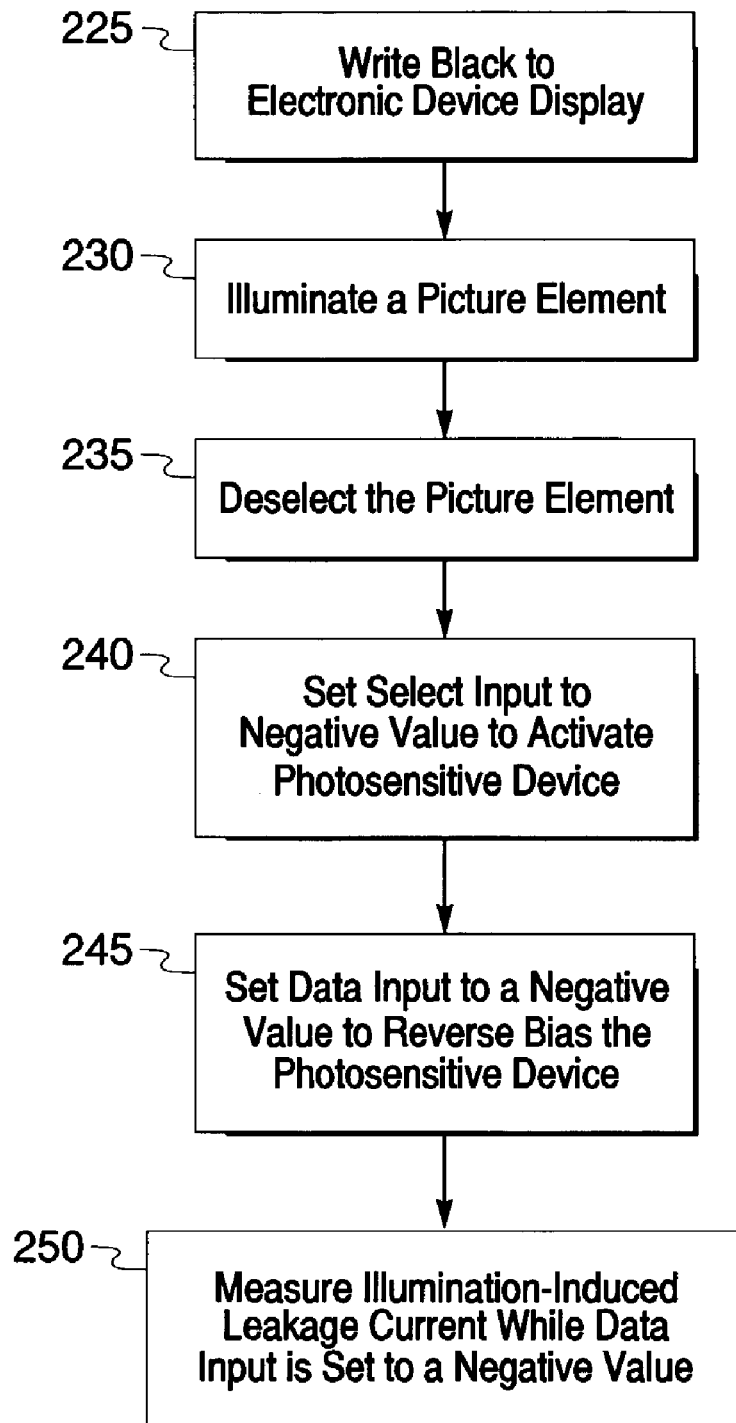
FIG. 5 shows a flowchart of a method of operating an electronic device display and document scanner according to an embodiment of the invention.

FIG. 5 shows a flowchart for a method of operating an electronic device display and document scanner according to an embodiment of the invention. The circuit of FIG. 4 is suitable for performing the method of FIG. 5. The method begins at step 225 in which the electronic device display is first placed in a quiescent state by writing black to the entire device display. Step 225 may be performed in a manner that accords with conventional techniques used by electronic devices to minimize the light generated by the device display. By minimizing the light generated by the display, any ambient light that is unintentionally coupled into one or more of the photosensitive devices can be reduced to a minimum.

With the display in the quiescent state, step 230 is performed in which a picture element is illuminated. As mentioned previously, this illumination can take place in a liquid crystal display by controlling the transparency of the picture element in manner that allows light to pass through the element and onto a surface of the display. In a light-emitting diode display, this illumination can be brought about by activating a light-emitting diode itself. At step 235, the picture element is deselected. At step 240, the select input is set to a negative value in order to allow a current to flow through the photosensitive device. At step 245, the data input is set to a value that places the device in a state wherein any current flowing though the device represents an illumination-induced current. For example, in the event that a photodiode is used as the photosensitive device of steps 240 and 245, the data input can be set to a negative value so as to reverse bias the photodiode. Thus, at step 250, the illumination-induced current from the photosensitive device represents a leakage current that can be measured while the data input is set to a negative voltage. In other embodiments of the invention, electrical signals other than leakage currents can be measured to determine the level of illumination to which the photosensitive device is being exposed.

Figure 6:
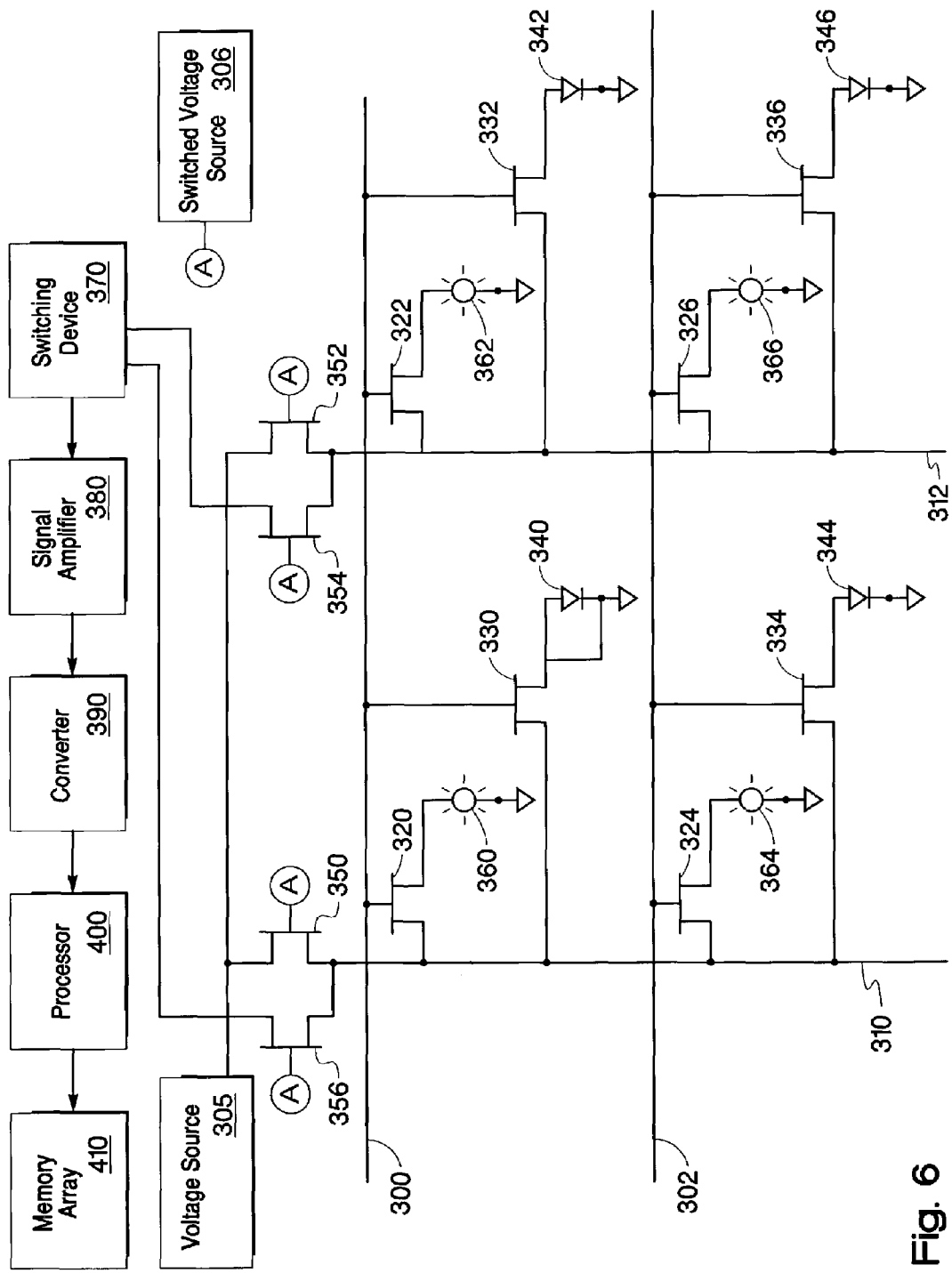
FIG. 6 shows a diagram of various functional elements used in an electronic device display and document scanner according to an embodiment of the invention.

FIG. 6 is diagram of various functional elements used in an electronic device display and document scanner according to an embodiment of the invention. FIG. 6 includes N-channel field-effect transistors 320, 322, 324, and 326, which are comparable to transistor switching device 220 of FIG. 4. FIG. 6 also includes P-channel field-effect transistors 330, 332, 334, and 336, which are comparable to transistor switching device 230 of FIG. 4. FIG. 6 also includes picture elements 360, 362, 364, and 366, which are comparable to picture element 161 of FIG. 4. FIG. 6 further includes photodiodes 340, 342, 344, and 346, which are comparable to photosensitive device 171 of FIG. 4. In FIG. 6, select input 300 and 302 correspond to select input 200 of FIG. 4, while data input 310 and 312 corresponds to data input 210 of FIG. 4. For purposes of simplicity, FIG. 6 includes only four picture elements, four photodiodes, and eight transistor switching devices that control the picture elements and photodiodes. However, it is contemplated that many more devices, perhaps thousands or even millions of picture elements and photodiodes, are arranged in a two-dimensional array having rows and columns such as those of FIG. 6.

In the embodiment of FIG. 6, transistors 350 and 352 are N-channel field-effect transistors that may be located apart from the surface of the display device, such as near processor 400. Transistors 350 and 352 are activated by applying a positive voltage to the gates of the transistors from switched voltage source 306, which allows a current to flow from voltage source 305. FIG. 6 also includes P-channel field-effect transistors 354 and 356, also located apart from the surface of the display device. Transistors 354 and 356 are activated by applying a negative voltage to the gates of the transistors from switched voltage source 306, which allows a current to flow from the transistor devices (such as 330) toward switching device 370. Although not explicitly shown in FIG. 6, the voltages present at gates of transistors 350, 352, 354, and 356 are controlled either directly or indirectly by processor 400, which commands switched voltage source 306.

In FIG. 6, each of select inputs 300 and 302 is sequentially activated so that a particular row of picture elements and corresponding photosensitive devices can be used to illuminate and then determine the amount of light reflected from the illuminated portion of a document. Thus, with select input 300 activated, transistors 320 and 322 are selected as well as other transistors along the horizontal row controlled by select input 300 (other transistors not shown). It is contemplated that select input 300 controls the gates of perhaps thousands of transistor switching devices similar to transistors 320 and 322.

With select input 300 activated, transistor 350 is activated in order to cause a current to flow through transistor 320 (by way of data input 310), thus illuminating picture element 360. Select input 300 is then set to a negative value in order to deactivate the gate of transistor 320 and to activate transistor 330. Transistor 350 is then deactivated and transistor 356 is activated, thus supplying a negative voltage to data input 310 to reverse bias photosensitive device 340. With photosensitive device 340 reverse biased, the leakage current received through data input 310 represents an illumination-induced current flowing through photodiode 340. In the embodiment of FIG. 6, this current pertains to the information present at the portion of the document illuminated by picture element 360. Switching device 370 then connects transistor 356 with signal amplifier 380 so that the current generated from photodiode 340 can be amplified and converted to a digital form by way of converter 390. Processor 400 then writes the digitized representation of the leakage current to an appropriate location within memory array 410.

Select input 300 and transistor 352 are then activated in order to cause a current to flow through picture element 362, and the above-described process performed using transistors 320 and 330, picture element 360, and photodiode 340 is repeated using transistors 322 and 342, picture element 362, and photodiode 342. With select input 300 and transistor 352 activated, transistor 322 causes picture element 362 to illuminate. Transistor 352 is then deactivated and transistor 354 is used to set data input 312 to a negative value in order to reverse bias photodiode 342. Switching device 370 then couples signal amplifier 380 to transistor 354 so that the illumination-induced leakage current from photodiode 342 can be converted to a digital form by converter 390 and written to memory array 410 by way of processor 400.

The above-described process is performed using each of the transistors in the row that are under the control of select input 300. The process is then repeated using each of the transistors in the row that are under the control of select input 302, and so forth. Thus, for a display having 1000 horizontal rows and 1000 columns, the above-described method would be performed one million times with switching device 370 having 1000 inputs. For each of the one million operations, processor 400 makes use of an address within memory array 410 in order to render a version of the document within the memory. Although not explicitly shown in FIG. 6, processor 400 controls the actions of switching device 370, which receives signals from data input 310 and 312.

In the apparatus of FIG. 6, a certain portion of light from a picture element may be coupled directly from a picture element to a corresponding photodiode apart from the light reflected from the portions of the document being scanned. Thus, processor 400 can perform a calibration procedure to determine the amount of light directly coupled from each picture element to each corresponding photodiode.

Figure 7:
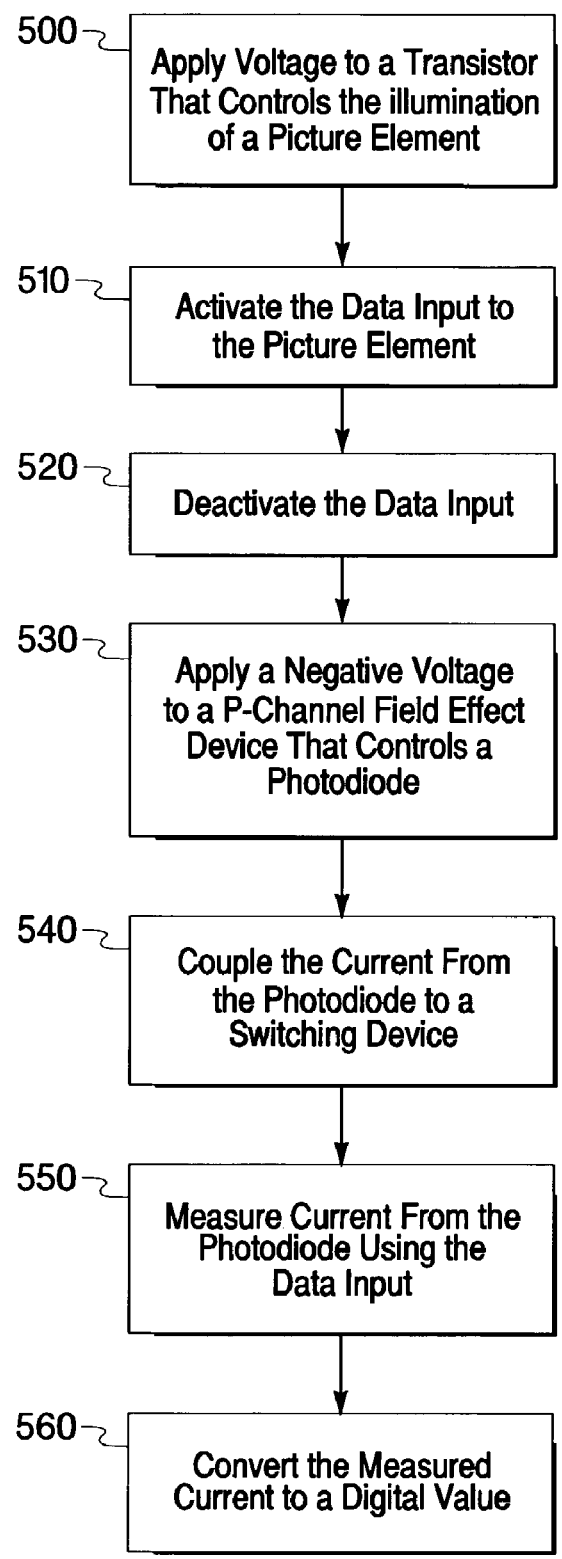
FIG. 7 shows a second flowchart of a method of operating an electronic device display and document scanner according to an embodiment of the invention.

FIG. 7 shows a second flowchart of a method of operating an electronic device display and document scanner according to an embodiment of the invention. The components arranged in FIG. 6 are suitable for performing the method of FIG. 7. The method begins at step 500, in which a voltage is applied to a transistor that controls the illumination of the picture elements. At step 510, the data input to a picture element of the display is activated. As a result of step 510, the picture element illuminates a portion of a document to be scanned. At step 520, the data input is deactivated. At step 530, a negative voltage is applied to a P-channel field-effect transistor that controls a photodiode. At step 540, the illumination-induced current from the photodiode is coupled to a switching device. At step 550, the current from the photodiode is measured using the data input. At step 560, the measured current is converted to a digital value.

In some embodiments, not all of the steps of FIG. 7 may be required. For example, a method of scanning a portion of a document using an electronic device may only include the steps of activating a data input to a transistor that controls the illumination of a picture element of the display, thereby illuminating a portion of a document in contact with or proximate with the display (step 510). The method may also include deactivating the data input (step 520), and measuring, by way of the data input, a current from a photosensitive device, wherein the signal is indicative of the light reflected from the illuminated portion of the document (step 550).

In conclusion, while the present invention has been particularly shown and described with reference to the foregoing preferred and alternative embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of scanning a portion of a document using an electronic device, the method comprising:

activating a data input to a picture element of a display to illuminate the portion of the document, the document being located proximate to the display;

deactivating the data input;

after said deactivation, applying a negative voltage to a p-channel field-effect transistor that controls a photosensitive device;

measuring, by way of the data input, a signal from the photosensitive device, the signal being indicative of the light reflected from the illuminated portion of the document; and converting a current from the photosensitive device to a digital value.

2. The method of claim 1, wherein the signal comprises the current received from the photosensitive device.

3. The method of claim 1, further comprising inputting the current from the photosensitive device to a multiplexer prior to the measuring step.

4. The method of claim 1, wherein the portion of the document is placed in contact with a surface of the display.

5. The method of claim 1, wherein the activating step comprises applying a second signal to a switch that controls the illumination of the picture element.

6. The method of claim 5, wherein the second signal is a voltage signal.

7. The method of claim 6, wherein the switch is a transistor.

8. The method of claim 7, wherein the transistor is an N-channel field-effect transistor.

9. A system for scanning a document, comprising:

a display having an array of individually-controlled picture elements, each of the picture elements being substantially collocated with one of a plurality of photosensitive devices that converts received light to an illumination-induced signal; and a plurality of data inputs, each of which controls a corresponding one of the picture elements, each of the plurality of data inputs also being coupled to a corresponding one of the photosensitive devices and receiving the illumination-induced signal from the photosensitive device to which the data input is coupled, wherein the photosensitive devices are photodiodes.

10. The system of claim 9, wherein the illumination-induced signal is a current received from the photosensitive device.

11. The system of claim 9 wherein each of the plurality of photosensitive devices is coupled to a P-channel field-effect transistor also substantially collocated with a corresponding one of the plurality of photosensitive devices.

12. The system of claim 9, additionally comprising a switching device coupled to each of the plurality of photodiodes, the switching device occasionally coupling each of the plurality of photosensitive devices to a converter that converts the illumination-induced current to a digital value.

13. The system of claim 12, further comprising a processor coupled to the converter that renders a scanned version of the document in a memory array.

14. The system of claim 9, further comprising a document holder that maintains the document in proximity with the display.

15. The system of claim 9, wherein certain ones of the array of individually-controlled picture elements produce light that is one of a primary color system that brings about a display of a color palette.

16. The system of claim 15, wherein the certain ones of the array of individually-controlled picture elements produce light that is one of red, green, and blue.

17. The system of claim 9, wherein the system additionally performs computing functions.

18. A combined display and scanning device, comprising:
- a display having a surface that displays information from an electronic device, the surface being capable of being placed in contact with a document;
- an array of picture elements distributed beneath the surface;
- an array of photosensitive devices, wherein each of the photosensitive devices is substantially collocated with a corresponding one of the picture elements, and wherein the data input used to control each of the picture elements is also used to receive data from the corresponding one of the substantially collocated photosensitive devices, the received data representing information contained on a portion of the document, wherein
- each of the picture elements is controlled by a corresponding, substantially collocated transistor.

19. The combined display and scanning device of claim 18, wherein the picture elements include a liquid crystal material placed between a light source and the surface.

20. The combined display and scanning device of claim 18, further comprising a select input that controls the gate of each of the corresponding, substantially collocated transistors distributed along a particular row of the array.

21. The combined display and scanning device of claim 18, wherein each of the photosensitive devices is a photodiode that produces an electric current when the photodiode is exposed to light.

22. The combined display and scanning device of claim 21, wherein the data input receives data from each of the photodiodes that is distributed along a particular column of the array.

* * * * *